April 21, 1936.    L. B. KIMBALL    2,037,908
VALVE FOR AUTOMATIC CONTROL OF ANTIKNOCK LIQUIDS
Filed May 6, 1935    3 Sheets-Sheet 1
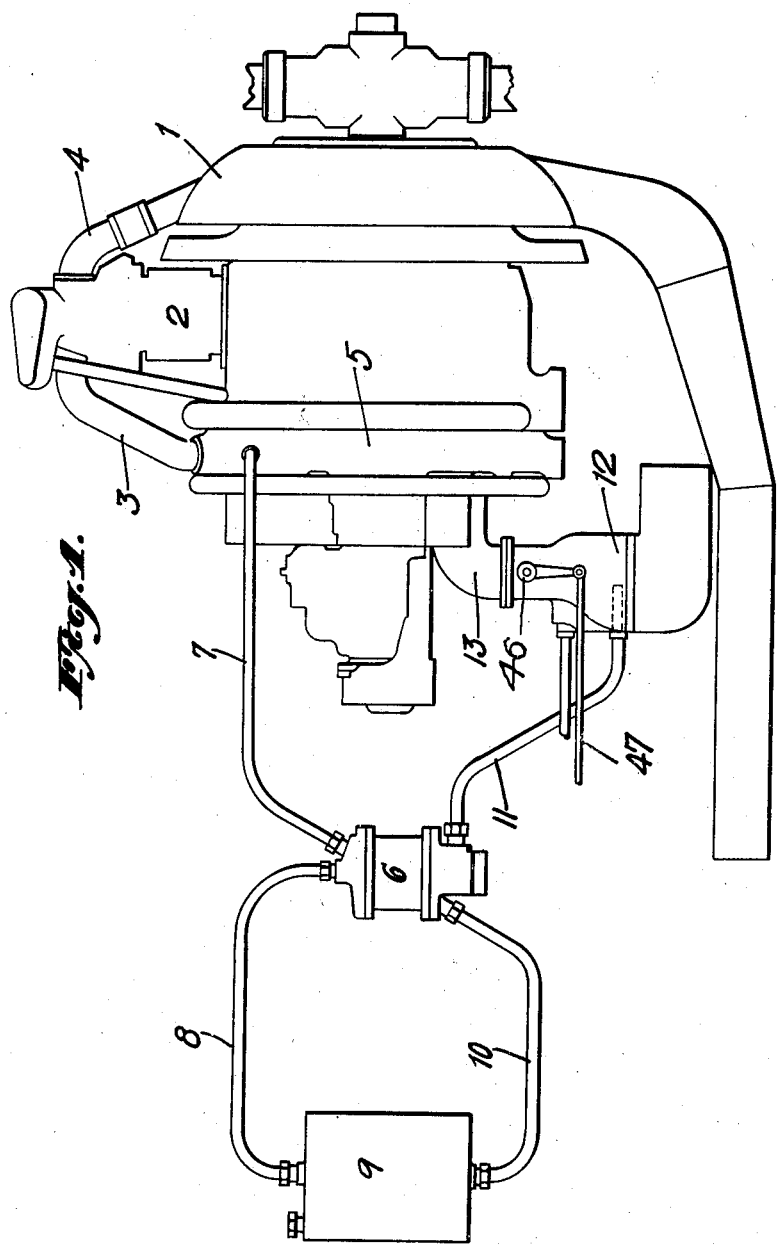
INVENTOR.
LEO B. KIMBALL
BY Sheffield & Betts
HIS ATTORNEYS.

April 21, 1936.   L. B. KIMBALL   2,037,908
VALVE FOR AUTOMATIC CONTROL OF ANTIKNOCK LIQUIDS
Filed May 6, 1935   3 Sheets-Sheet 2
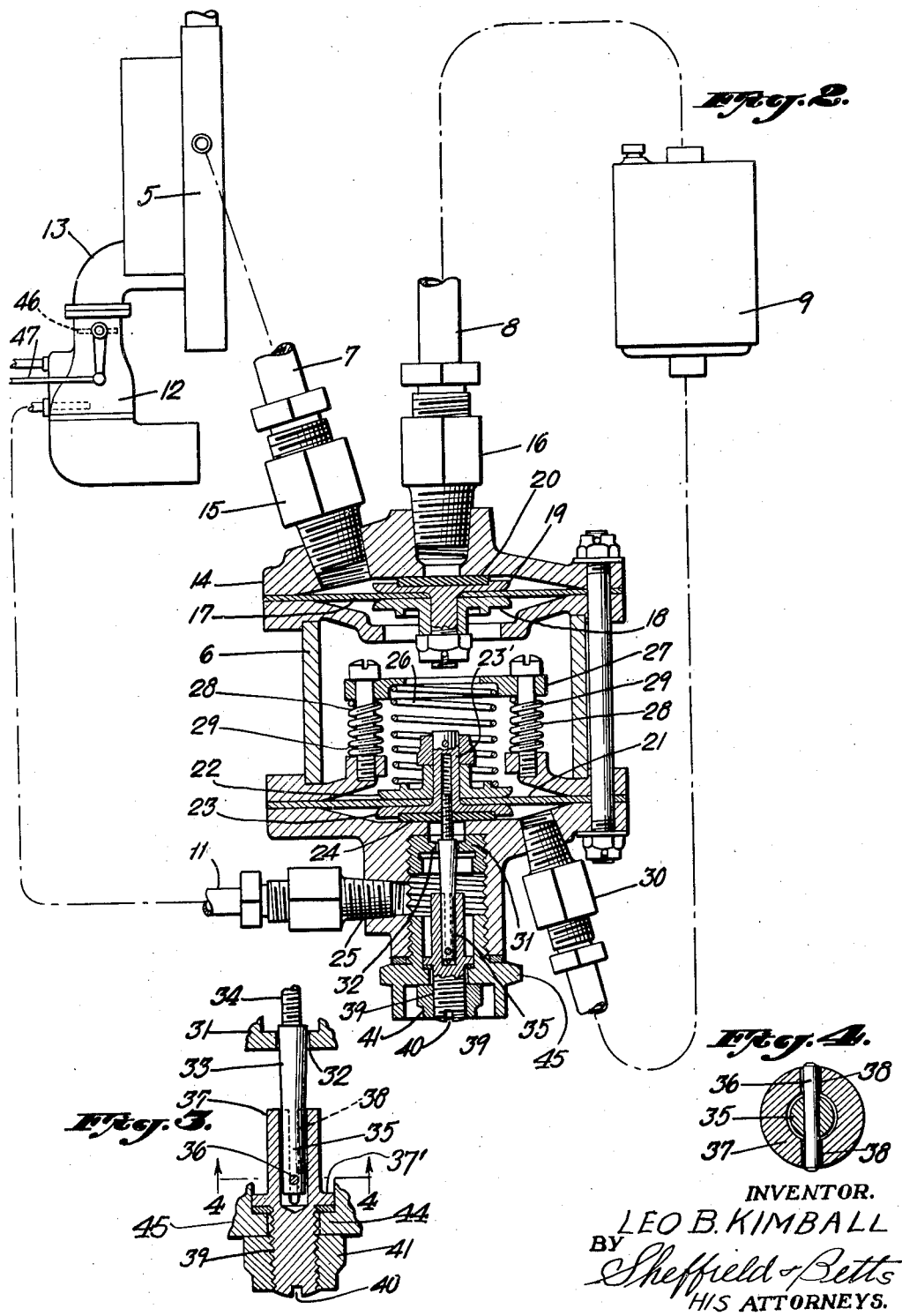
INVENTOR.
LEO B. KIMBALL
BY Sheffield & Betts
HIS ATTORNEYS.

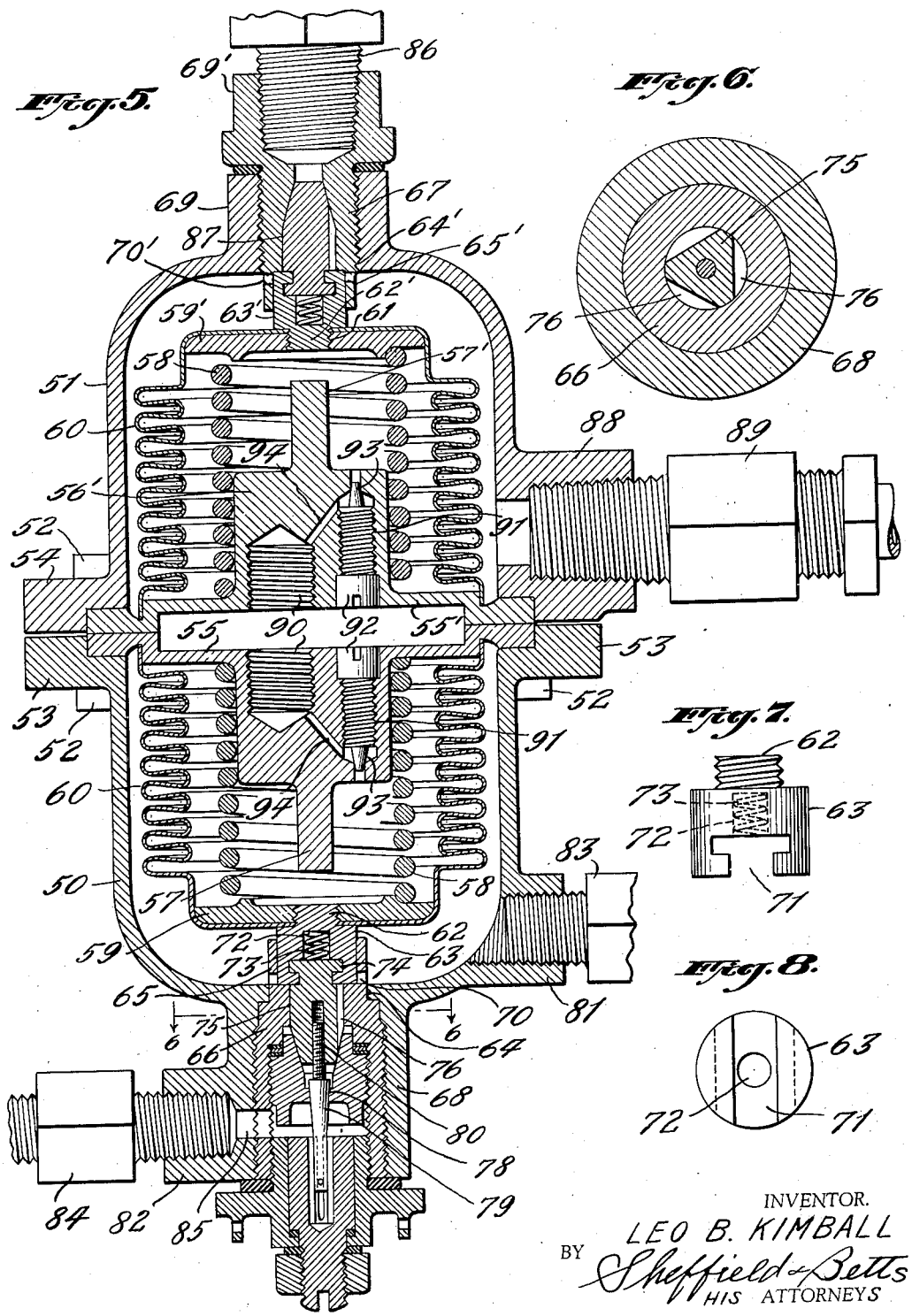

Patented Apr. 21, 1936

2,037,908

UNITED STATES PATENT OFFICE 2,037,908

VALVE FOR AUTOMATIC CONTROL OF ANTIKNOCK LIQUIDS

Leo B. Kimball, New Haven, Conn., assignor to Fuel Development Corporation, a corporation of Delaware Application May 6, 1935, Serial No. 19,955

8 Claims. (Cl. 137—153)

This invention relates to certain improvements that pertain primarily to the fractional supply of anti-knock liquids to the intake conduits or apparatus of an internal combustion engine or to engines of similar nature, for distribution in the air-fuel mixtures used in the operation thereof.

The invention of this application has more particularly to do with the supply of anti-knock liquids to internal combustion engines which are used with a so-called "supercharger", which has usually been in the form of a blower, or there may be other devices for producing a pressure in the intake of an internal combustion engine above normal atmospheric pressure.

Although such superchargers have been used to some extent in connection with automobile engines, yet their use in connection with airplane or aircraft engines is particularly valuable because when an airplane is "taking off" the power required of the engine is above the normal power that would ordinarily be produced with a wide open throttle valve. Such superchargers are also valuable in aircraft engines when the same are climbing to attain high altitudes and where normal atmospheric pressure is below that which exists at or near the surface of the earth.

One object, therefore, of the present invention is to make certain changes in and additions to the valve heretofore invented by me for the fractional supply of fluids to internal combustion engines, such as is described in my prior Patent No. 1,974,071, issued September 18, 1934. In said patent the general considerations surrounding the operation of internal combustion engines and the reason for adding anti-knock liquids thereto at certain times are fully set forth, and it is deemed unnecessary to repeat the same in this specification.

It may be said, in addition thereto, that in the use of a supercharger with aircraft engines, the supercharger produces an increased pressure which sometimes may amount to one atmosphere above normal atmospheric pressure at sea level. When an airplane takes off from the ground or water surface at practically sea level, the pilot opens the throttle valve to some predetermined point approaching its widest opening. Owing to the high speed of the airplane engine at such times the supercharger (or blower) produces an increased pressure in the intake manifold of the engine. At such times the tendency to produce knocking in the engine is increased, particularly if the gasoline is of low grade or the engine has become foul from carbon or a poor condition is produced from other causes.

As the airplane attains greater elevation the the additional intake pressure produced by the supercharger becomes somewhat neutralized by the drop in atmospheric pressure and the pilot therefore opens the throttle to a somewhat greater extent, which causes the supercharger to produce still more pressure to overcome that lost on account of the higher altitudes and so to increase the power and speed of the engine in order to cause the aircraft to continue to rise steadily.

When the desired cruising altitude is reached the throttle is somewhat closed so that it is usually about three-fourths of its maximum opening and this is continued at the cruising speed, after which it is not necessary to change the position of the throttle except under adverse or unexpected conditions.

At cruising speeds of an aircraft, the supercharger or blower produces no effective pressure in the intake, that is, the effective result thereof may be equal to or below atmospheric pressure at sea level. Such speeds, in cruising, are substantially normal speeds of the aircraft, and therefore, since no considerable extra power is required, the fuel-air mixture or charge is substantially normal and the intake suction of the engine supplemented by the supercharger pressure to overcome the reduced air pressure supplies the necesasry charge to practically the same degree as would occur at sea level.

As above stated, the knocking tends to occur only at times when considerable extra power is required of the engine, such as when taking off or rising to higher altitudes. Consequently, it becomes necessary only to supply the anti-knock liquid at such times.

This part of my invention, therefore, resides in a valve for adding the anti-knock liquid economically when used with a supercharger or blower connected with an aircraft engine, and also when used with automobile engines when such valves are installed as a part of the automobile equipment. The installation for automobile uses of the valve and with a supercharger is not substantially different from the use of the valve with an aircraft supercharger, the main difference in the first case being in the type of engine used.

For a detailed description of one form of my invention which at present is deemed preferable, reference may be had to the following specification and the drawings forming part thereof, in which Figure 1 is a side elevation of an airplane engine showing the relative locations of the respective parts and their connections with each other;

Figure 2 is a schematic diagram of the apparatus shown in Figure 1, the valve itself being shown in cross-section to indicate the relative positions of the parts thereof and for simplicity the pipe connections being shown by dot and dash lines;

Figure 3 is a vertical cross-sectional view of the lower part of the valve shown in Figure 2;

Figure 4 is a cross-sectional view, substantially horizontal, taken on the line 4—4 of Figure 2;

Figure 5 is a sectional view of a modified form of valve that was not described in my prior application above mentioned;

Figure 6 is a cross-sectional view taken substantially on the line 6—6 of Figure 5;

Figure 7 is a side elevation of one of the valve members; and

Figure 8 is a plan view of the bottom of the member shown in Figure 7.

Referring particularly to Figure 1 of the drawings, the numeral 1 indicates the airplane engine which has a multiplicity of radially located cylinders, such as indicated by the numeral 2. The pistons in these cylinders are connected with the main crank, as is usual in such devices, and the cylinders are also provided with intake and exhaust pipes, as indicated by the numerals 3 and 4, respectively.

At the left hand of the crank case is a circular housing 5 which contains the rotating pump or blower constituting the supercharger, the rotating part of said blower being operated from the crank shaft of the engine or from a rotating device driven from the exhaust pressures of the engine, as is well known in the art. Obviously, the supercharger may be driven by other means when preferred.

The improved valve which I have invented for use in connection with this type of apparatus is indicated by the numeral 6. The numeral 7 indicates a pipe leading from the supercharger casing 5 to said valve. The pipe 8 is a pipe leading from said valve to a closed reservoir or supply tank 9 for the anti-knock liquid. From the bottom of the reservoir 9 is a pipe 10 which leads to the valve 6 and through which the anti-knock liquid passes so that it is controlled by said valve. From the lower part of the valve is a pipe 11 that is connected with the carburetor 12. This carburetor 12 is connected with the supercharger or blower by a suitable pipe 13 so that the air-fuel mixture passes through said supercharger to the intake pipes which lead to the cylinders of the engine.

Referring now to Figure 2, in which the above mentioned parts are indicated schematically, it will be seen that the various pipes are connected with the valve 6 as above described, so that it will operate to perform its required functions when constructed as follows:

The top of the casing or housing 14 is provided with a union or nipple 15 with which the pipe 7 from the supercharger 5 is connected. A second nipple 16 entering the top of the housing 14 is connected with the pipe 8, from the supply tank 9. Below the top of the housing 14, there is a resilient diaphragm 17 that may be in the form shown or of other equivalent form to produce a resilient pressure. The diaphragm 17 carries two discs 18 and 19, the upper disc being provided with a flexible washer or gasket 20 which is adapted to close the opening in the top of the housing that is located immediately below the nipple 16.

In the lower part of the housing 14 a second diaphragm is provided as indicated at 21. This is also provided with two circular discs 22 and 23, the lower one of which also carries a packing or gasket 24 which is adapted to close the outlet 25 in the bottom of the housing. The circular disc 22 supports one end of a helical spring 26, the upper end of which is held in position by the annular cap 27, which cap is supported on screw-threaded posts or studs 28. The cap is held adjustably in position by the helical springs 29 surrounding said studs. The spring 26 tends to hold the gasket 24 in contact with the lower end of the housing so as to close the outlet 25 except when the necessary counter-balancing fluid pressure is active to raise the same. This pressure is supplied through the nipple 30 which connects with the pipe 10 leading to the bottom of the supply tank or reservoir 9. The air pressure in the space between the diaphragm 17 and the diaphragm 21 constitutes a resilient cushion, and is effective to aid in determining the points at which the respective valves open. Obviously, the resiliency of the respective diaphragms may be so chosen to determine their pressures. Beneath the outlet 25 in the housing 14 is a thimble 31 which is screw-threaded within a suitable opening, and said thimble is provided with a transverse partition having a hole or opening therein, as indicated at 32. Within the opening 32 is a valve member 33 having varying transverse diameters which determine or meter the rates at which the liquid will flow through the opening 32. This valve member 33 is provided with a screw-threaded projection 34 which passes through the disc 23 and is adjustably carried in the hub thereof 23'.

Below the tapering portion of the valve member 33 is a cylindrical portion 35 which is provided at its lower end with a transverse pin 36. A tubular member 37 is provided with longitudinal slots 38 within which the ends of the pin 36 may slide up and down. The tubular portion 37 is continued downward and is screw-threaded as indicated at 39 and is provided with a groove 40 for turning by means of a screw-driver.

The screw-threaded portion 39 is preferably provided with a locknut 41 which may be used to hold the flange 37' of the tubular portion 37 in its adjusted position on the flange 44 of the thimble 45. It will now be seen that when the screw-threaded portion 39 is rotated by means of a screw-driver the cylindrical portion 35 of the valve spindle and the tapering portion 33 thereof will be raised or lowered with reference to the opening 32 so that the rates of flow or metering of liquid through said opening can be adjusted to cover the required range for the correct flow of anti-knock liquid under various requirements of the engine. I do not wish to be understood as being limited to this particular form of adjusting means above described, although the same is quite similar to that illustrated and described in my prior patent above referred to.

Referring to Figure 2, and supposing the throttle valve of the engine is opened for taking off from the surface of the earth or a water surface, the supercharger or blower will produce the necessary pressure above atmospheric pressure so that the mixture of fuel and air will be impelled or driven into the intake passages of the engine by a pressure that is above normal atmospheric pressure. This will increase the pressure through the pipe 7, nipple 15 and the space above the diaphragm 17. Thus the diaphragm will be pushed downward and the orifice below the nipple 16 will be opened so that the pressure can pass through the nipple 16, pipe 8, to the upper portion of the reservoir 9. That pressure will then cause the liquid therein to be forced out from the bottom thereof so that it will pass through the pipe 10 and the nipple 30 into the space below the diaphragm 21 and such pressure on the diaphragm will cause the gasket 24 to be raised and so open the discharge outlet 25. That also causes the liquid to pass through the opening 32 surrounding the valve member 33. This member constitutes a metering device which will accurately determine the rates of flow of the anti-knock liquid into the chamber below said transverse partition in the thimble 31. The amount of variation in the diameter of the valve member 33 should be accurately determined in order that the rates of flow of the liquid controlled thereby will correspond to the desired amount that it is necessary to add to the air-fuel mixture. The variations in the valve member are determined by the amount of anti-knock or other fluid required to be added at various supercharger pressures throughout the range of supercharger pressures and according to the requirements of the engine. Thus the liquid will flow through the nipple 42 and the pipe 43 to the carbuertor 12 where it is mixed with the incoming air and when mixed with the fuel, passes through the pipe 13 to the supercharger 5. It then flows to the cylinders of the engine through the intake pipes 3.

Regarding the adjustment of the valve member 33 having varying diameters in the opening 32 through the partition in the nipple 31, that is accomplished, as above indicated, first, by loosening the locknut 41 so that the tubular portion 37 may be rotated. Then by rotating the tubular portion 37 in a clockwise direction the valve member 33 will be raised by reason of its being screwed further into the hub 23' extending from the disc 23. When the proper position has been reached, the screw-driver is removed and the locknut again screwed into position so that the flange 37' will be pulled down onto the internal flange 44 of the screw-threaded thimble 45 which closes the lower end of the housing 14. Thereafter, the tubular portion 37 will not be further rotated until the locknut 41 is again loosened.

It may be stated here that the position of the valve spindle 33, as relates to the disc 23, will be slightly higher for high powered engines than it is when usued in connection with other engines of smaller power, since higher powered engines require more fuel.

As is usual in connection with aircraft engines similar to those above described, as well as in connection with engines for propelling automobiles, the carburetor is provided with a throttle valve which, in the present instance, is indicated above the carburetor 12, at 46. This throttle valve is one of the usual accessories supplied with such aircraft or automobile engines and is connected with the device to be controlled by the operator of the engine through a rod 47, in any manner known in the art.

Having thus described this arrangement of my improved valve as relates to the supercharger and the carburetor of an aircraft engine, it will be seen that I have provided a valve which is automatically operated in connection with the throttle valve control for determining the amount of fuel to be supplied to an internal combustion engine. This arises by reason of the fact that the supercharger produces the additional pressure in proportion to the speed and power required of the engine. The speed of the engine determines the speed of rotation of the rotating element of the supercharger, and therefore its supercharging or fluid pressure action.

It will be appreciated that the automatic control comes into play primarily when the aircraft is taking off from the surface of land or water and the valves automatically provide the necessary supply of anti-knock liquid in accordance with the extra unusual power demanded of the engine.

It will be apparent from the above description that the use of a "supercharger" may not always be required. The pressure on the surface of the supplementary liquid in the reservoir may be produced in other ways. When the usual exhaust pressure from an internal combustion engine is sufficiently high the exhaust passages of the engine may be connected by a conduit with the upper portion of the reservoir and the valve for controlling the pressure in said conduit may or may not be inserted, depending upon the operating characteristics of the engine.

It will also be apparent that the valve for controlling the pressure on the supplementary liquid may be omitted even where the pressure is produced by a supercharger or similar pressure device.

Also, said supercharger pressure valve may be operated mechanically, as simultaneously with the throttle valve if such an arrangement be desirable.

The above form of my invention is divided from my prior application Serial No. 707,550, filed January 20, 1934.

Referring now to the modified form of valve illustrated in sheet 3 of the drawings (Figures 5, 6, 7 and 8). it will be understood that this form of valve operates in a manner very similar to the form of valve first above described.

In Figure 5, the numeral 50 indicates the lower part of the valve casing and the numeral 51, the upper part thereof. These two parts are preferably bolted together by bolts 52 passing through flanges 53 and 54 around the ends of the parts forming the housing.

It will be appreciated that the parts 50 and 51 of the main housing being bolted together or otherwise attached to each other, as by the bolts 52, the said main housing is substantially like that before described but the two parts thereof are preferably manufactured separately for ease of construction and so that the respective valve members therein may operate under separate forces both as to the fluids and the resilient members or springs.

Obviously, other methods of making the housing may be used, consistent with obtaining similar operative results.

Seated in annular recesses in the respective parts of the housing, are circular plates 55 and 55', each of which has a central projection 56 and 56'. The central portions of the projections 56 and 56' are provided with a boss or stud 57 and 57'. The latter constitute stops that will be hereinafter referred to. Surrounding said projections 56 and 56' are helical spirngs 58, one end of each said spring being seated on the plates 55 and 55', respectively. Opposite said springs are circular plates 59 and 59', on which the other ends of said springs 58 are seated. Said plates correspond to the plates 18, 19, 22 and 23, in Fig. 2. The plates 55, 55', 59 and 59' are connected by resilient corrugated bellows 60, which form expansible and contractible walls having substantially the same effect as the diaphragms as provided with a modification illustrated in Fig. 2 by the numerals 17 and 21.

The circular plates 59 and 59' are provided with central screw threaded openings 61 which receive screw threaded projections 62 and 62' extending from the valve members 63 and 63'. Said valve members are indicated more in detail in Figs. 7 and 8.

The housings 50 and 51, respectively, are provided with circular openings in the tops and bottoms thereof, as indicated at 64 and 64'. Projecting through said openings are collars 65 and 65', said collars being carried on tubular members 66 and 67, which are contained within cylindrical projections 68 and 69 on the respective housings. The tubular members 66 and 67 and the internal surfaces of the projections 68 and 69 are screw-threaded so as to retain said tubular members in position therein. The collar 65 is provided with passages 70 to permit the liquid to pass therethrough, and the collar 65' with passages 70'.

Referring now to the parts contained within the cylindrical projection 68 of the housing 50, it will be seen that the cylindrical member 63 is provided with a transverse slot 71, which is wider at its upper end as indicated in Figs. 7 and 8.

Above said transverse slot is a recess 72 which contains a spring 73 that is under compression when in normal position. Contained within the slot 70 is the circular head 74 which projects from the cylindrical and tapering valve stem 75. This valve stem 75 is generally cylindrical in form but is provided with cutaway portions 76, as indicated in Fig. 6, so as to permit the passage of the antiknock or other liquid through the opening 64 and past the cylindrical portion of said valve stem to points below the tapering portion thereof. Said tapering portion fits within a substantially cylindrical plug 77 which has a central opening 78 therein. Passing through said opening is a tapering valve member 79 which is similar to and for the same purpose as the valve member 33 indicated in Figs. 2 and 3.

Said valve member has a screw threaded projection 80 which enters the valve stem 75 and by reason of said tapering valve member having a screw threaded projection, it is adjustable relative to said stem. The adjustment of said valve member is accomplished in the same manner and by the same means as described in connection with the structure shown in Fig. 3 of the drawings relating to the first form of the valve. It, therefore, will not be described in detail at this point.

Said housing 50 is provided with an inlet hollow connecting boss 81 and an hollow connecting outlet boss 82, to which the pipes 83 and 84 are, respectively, connected. These pipes correspond to pipes 10 and 11 in Figs. 1 and 2 of the drawings.

The tubular member 66 is provided with an opening 85, which allows communication from the interior of said cylindrical member to the outlet boss or connection 82.

The upper housing 51, which is provided with the cylindrical projection 69 and contains the tubular member 67, is provided with a connecting portion 69' to which may be attached one end of a pipe 86 which corresponds to the pipe 8 in Figs. 1 and 2 of the drawings. The movable valve stem 87 is constructed substantially identically with the valve stem 75 except that it has no threaded opening therein. The head of said valve stem is retained within the plug 63' by the same means described in connection with the plug 63 and as illustrated in Figs. 7 and 8. The remaining portions, constituting the spring, bellows, etc., are identical with similar parts contained in the lower housing 50 and therefore will not be again described, the same being obvious from a consideration of Fig. 5 of the drawings.

The housing 51 is provided with an hollow inlet boss 88 to which is connected a pipe or union 89 and corresponds to similar parts indicated by the numerals 7 and 15 in Figs. 1 and 2. The latter pipe, as shown in said figures, is connected with a supercharger such as indicated at 5 in Figs. 1 and 2.

The pipe 86 passes to the top of a suitable supply tank as does the pipe 8 indicated in Figs. 1 and 2.

Referring now to the flexible diaphragms or bellows 60 within each of the housings 50 and 51, it is intended in the present modification of the valve to have the air pressure within said bellows comparatively low so as to produce a decided difference in pressure between the interiors and exteriors thereof. The exhausting of the atmospheric pressure within said bellows is accomplished as follows:

The plates 55 and 55' that are provided with the projections 56 and 56' have drilled and screw threaded recesses 90, adapted to receive temporarily, the end of a pipe from an exhaust pump or other similar apparatus. Said projections are also provided with smaller drilled and screw threaded holes 91 adapted to receive screws 92, the end of which terminates in needle valves 93. The lower end of the hole 91 is connected with the lower end of the drilled recess 90 by a small passage 94 which allows the atmosphere withdrawn from the interior of the bellows to pass to the suction pump.

Under these conditions when the pressure is sufficiently reduced within either of the bellows units the screw 92 may be set up so that the needle valves 93 close the openings in the bottom of the holes 91. Thus the interior of the bellows units will be effectually sealed and no air will enter therein.

It may be said at this point that the force of the springs 58 is such as to substantially counterbalance the compressive force of the external atmosphere exerted on the plates 59 and 59' and said plates will not be moved transversely unless the pressure on the exteriors thereof increases sufficiently to compress the springs 58 further.

Referring now to the projections 57 and 57', it will be seen that they are in line with the screw threaded ends 62 and 62' of the valve members 63 and 63' and that a definite distance exists between these parts. This arrangement prevents the movement of the discs 59 and 59' in an inward direction in case the atmospheric pressure on the plates 59 and 59' and their connective parts should become more than is necessary to operate the valve members.

The operation of this form of the valve last described is substantially the same as that of the first form of the valve illustrated in Figs. 1 to 4, inclusive, the main difference being that in the second form of valve the bellows or corrugated cylindrical diaphragm arrangement enables reduced pressures to be maintained therein, which pressures may be a substantial vacuum or may have a definite relation to the atmospheric pressures external thereto.

This enables the valve to operate with greater accuracy. The reduced air pressure within the resilient bellows is not materially acted upon by changes in temperature due to varying altitudes or other factors which change the temperature of the surrounding atmosphere.

When the pressure in the supercharger, which is connected with the intake 88 of the upper housing 51, of the valve increases on account of the greater opening of the throttle valve in the engine, the plate 59' will be depressed and allow the pressure from the pipe 89 to pass through and around the valve stem 87 and out through the pipe 86 by which said pressure is conducted to the reservoir containing the anti-knock liquid as indicated at 9 in Fig. 2. Said pressure then acts upon said liquid and forces the same through the pipe 83, the hollow boss 81. into the space below the disc or plate 59. Said pressure will, therefore, raise said plate and the valve member 63 so that the liquid can pass through the holes 70 in the guide member 65, through the opening 64, past the valve stem 75 and down to the metering valve 78, thence the liquid will flow through the passage 85 and into the hollow connecting member 82 and thence to the pipe 84. In passing through that pipe the liquid will then be conducted to the carburetor of the airplane as indicated by the pipe 11 in Fig. 1.

Thus it will be seen that this form of the valve operates in substantially the same manner as that described in connection with Figs. 1 and 2, the differences being in the mechanical details and in the fact that the valves are operated by the differences in pressures between the fluid or air outside of the bellows and the reduced pressures within the same.

Furthermore, it will be noted that each of the bellows units may be evacuated independently of each other after which they may be placed within their respective housings and their housings bolted together to form the completed valve as above pointed out and as illustrated.

I desire it to be understood that I do not wish this invention to be considered as being limited to the specific details or form of arrangement of parts herein described, except in so far as they may be consistent with the scope and tenor of the accompanying claims, for various changes may be made without departing from the spirit of my invention.

What I claim and desire to protect by Letters Patent is:

1. A valve for controlling and regulating the flow of varying amounts of a supplementary liquid under fluid pressure, to the intake passages of an internal combustion engine, comprising, an housing closed to atmosphere, a movable valve member therein located opposite a valve orifice that allows the passage of said liquid through said valve, said housing having an inlet and an outlet passage on opposite sides of said orifice to permit the passage of liquid through said valve, and resilient means for holding said valve member upon said orifice when insufficient counterbalancing fluid pressure exists in said inlet passage to displace said valve member, said housing also having a part provided with a constricted opening and located between said orifice and said outlet passage, whereby the rate of flow of liquid passing through said valve is determined and metered because of the varying pressure of said liquid when said orifice is open.

2. A valve for controlling and regulating the flow of varying amounts of a supplementary liquid under fluid pressure, to the intake passages of an internal combustion engine, comprising, an housing, movable valve members located adjacent opposite portions thereof, said housing having orifices located opposite said valve members for allowing the flow of said liquid therethrough, an inlet passage and an outlet passage being located in said housing on opposite sides of each of said orifices, respectively, the space between said valve members being closed to atmosphere, and resilient means on which said valve members are carried for holding said valve members upon said openings to close the same, respectively, when insufficient counterbalancing fluid pressure is active in the respective inlet passages to displace said valve members.

3. A valve for controlling the flow of varying amounts of a supplementary liquid under fluid pressure, to the intake passages of an internal combustion engine, comprising, an housing, two flexible diaphragms carried adjacent opposite portions thereof, a contacting resiliently mounted valve member carried by each of said diaphragms and located opposite orifices which allow the passage of said liquid under pressure through said valve, said housing having an inlet passage and an outlet passage on opposite sides of each of said orifices, respectively, to permit the ingress and egress of said liquid to and from each portion of said valve, a second movable valve member connected with the first-named valve member and having varying diameters to meter, automatically, the rates of flow through a third orifice within which said valve member is located, and said last-named valve member having a screw-threaded connection with said first-named resiliently mounted valve member and being capable of rotation therein to adjust the position of said varying valve member in said last named orifice relative to the first-named valve member.

4. A valve for controlling and regulating the flow of varying amounts of a supplementary liquid under fluid pressure, to the intake passages of an internal combustion engine, comprising, an housing closed to atmosphere, movable valve members located adjacent the outer ends thereof, said housing having valve orifices located opposite said valve members, there being inlet and outlet passages located in each end of said housing on opposite sides of each of said orifices, respectively, and resilient means on which said valve members are carried, for holding said valve members upon said openings to close the same, respectively, when insufficient counterbalancing fluid pressure is active in the respective inlet passages to displace said valve members.

5. A valve for controlling the flow of varying amounts of liquid under the action of fluid pressure on said liquid, comprising, a two-part housing, resiliently supported plates adjacent opposite portions thereof, valve members attached to the central portions of said plates, said housing parts having orifices located opposite said valve members, separating members carried by each part of said housing, flexible means between said separating members and said plates, said means being adapted to have a predetermined amount of fluid pressure in each one thereof, each of said parts of said housing having an inlet passage and an outlet passage on opposite sides of each of said orifices respectively to permit the flow of fluids through each portion of said valve, so that said fluid pressures in said inlet passages are active upon each of said plates to displace said valve members and open said orifices.

6. A valve for controlling the flow of varying amounts of liquid under the action of fluid pressure on said liquid, comprising, a two-part housing, resiliently supported plates adjacent opposite portions thereof, said plates having valve members attached to the central portions thereof, orifices located opposite said valve members for allowing the flow of fluid under pressure therethrough, separating members between the two parts of said housing, resilient bellows connected with said separating members and with said plates, said bellows being adapted to have a predetermined amount of fluid pressure in each one thereof, each of said parts of said housing having an inlet passage and an outlet passage on opposite sides of each of said orifices, respectively, to permit the flow of fluids to and from each portion of said valve, so that said fluid pressures in said inlet passages are active upon said plates to displace said valve members and permit the flow of fluids through said orifices, respectively, and a second movable valve member connected with the first-named valve member and having varying diameters to determine the rates of flow of said liquid through a third orifice in one of the parts of said housing and within which said varying valve member is located.

7. A valve for determining the flow of varying amounts of a liquid under fluid pressures, comprising, an housing having a restricted orifice in one portion thereof, a valve member in said orifice and having varying diameters to meter, automatically the rates of flow of said liquid through said orifice, fluid pressure controlled means for movably supporting said valve member in said orifice, a tubular member adjustably retained in and entering said housing and having parallel longitudinal slots therein, said valve member having a transverse pin connected therewith and which is slidable in said slots, means for holding said tubular member adjustably in fixed angular positions, and screw-threaded means between and connecting said varying valve member and said supporting means to afford adjustment of said varying valve member relative to said supporting means.

8. A valve for determining the flow of varying amounts of liquid under fluid pressures, comprising, an housing having a restricted orifice in one portion thereof, a tapering valve member in said orifice, the longitudinal movement of which automatically meters the rates of flow through said orifice, resilient fluid pressure controlled means for movably supporting said valve member in said orifice, a tubular member adjustably retained in and entering said housing and having parallel longitudinal slots therein, said valve member having a transverse pin therein, the ends of which pin are slidable in said slots, means for holding said tubular member adjustably in fixed positions relative to said housing, and screw-threaded means between and connecting said varying valve member and said supporting means to afford adjustment of said varying valve member relative to said supporting means.

LEO B. KIMBALL.